Dec. 31, 1946.  A. D. GIFFORD  2,413,307
FLOWER HOLDER
Filed Jan. 7, 1943
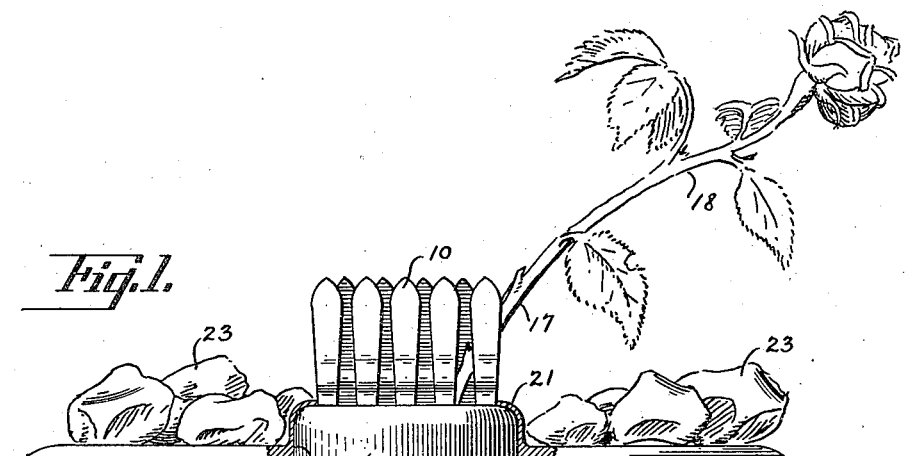
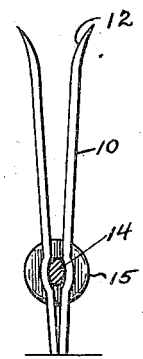
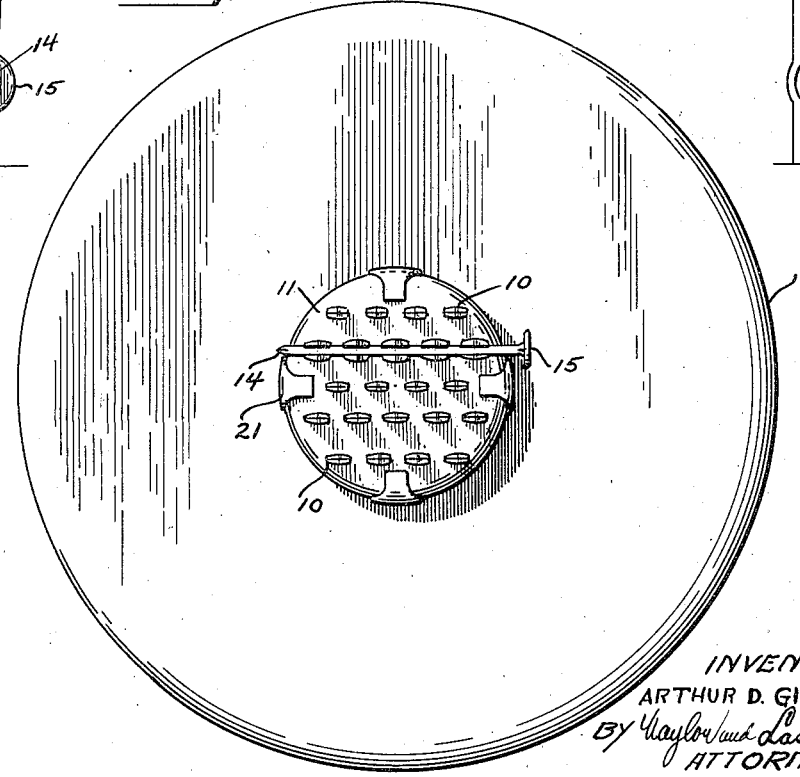
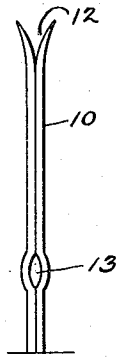
INVENTOR
ARTHUR D. GIFFORD,
BY Taylor and Lassagne
ATTORNEYS.

Patented Dec. 31, 1946

2,413,307

UNITED STATES PATENT OFFICE 2,413,307

FLOWER HOLDER

Arthur D. Gifford, Milford, Calif.

Application January 7, 1943, Serial No. 471,535

1 Claim. (Cl. 47—41)

This invention relates to flower holders of the type useful in the decorative arts.

It is an object of this invention to provide in combination a novel spring clip means for engaging flower stems to retain the flowers in any desired arrangement and an anti-tipping means associated therewith to stabilize the entire assembly. It is a further object of this inention to provide a combination like that above-described which will blend into and become an inconspicuous part of floral displays supported thereon.

It is also an object of this invention to provide an anti-tipping device adapted for use with flower holders or "frogs" of the conventional types which will stabilize the much desired off-center floral arrangements.

Another object of this invention is to provide a novel spring clip flower holder and a simplified means of opening the jaws of the clips to facilitate insertion of the flower stems.

It is a further object of the invention forming the subject matter hereof to furnish a flower holder having but a minimum of parts, which may be easily manufactured, which will be useful for the purpose intended, and which will be available at prices comparable to those prevailing in this art.

Other objects of the invention will become apparent as this specification proceeds and the particular novelty of the same will be pointed out in the claim appended hereto.

In the drawing forming a part hereof:

Figure 1 is a side elevation of a flower holder embodying the principles of my invention.

Figure 2 is a top plan view of the subject matter of Figure 1.

Figure 3 is an end elevation of one of the spring clips employed in the invention with the jaws thereof sprung by an associated opening means, and Figure 4 is an end view of the clip of Figure 3 in closed position.

In the preferred form illustrated in the drawing the flower holder forming the subject matter hereof comprises a plurality of spring clips 10 embedded in a base 11 and arranged in staggered relation in parallel rows (see Figure 2). Any convenient means of attaching the clips 10 to the base 11 may be employed, such as by frictional engagement, as shown, or by welding or the like The clips 10 each consist of a pair of leaf members with their faces abutting and their respective upper ends flared outwardly to define a jaw entrance as at 12. In proximity to their embedded ends the leaves of the clips are complementarily deformed to provide an opening 13 therein substantially ovate in shape. The openings 13 are adapted to receive the shank 14 of a pin 15, the shank being substantially ovate in cross section and corresponding to the shape of the opening 13.

The purpose of the pin 15 when inserted in opening 13 is to open the jaws of the clip (see Figure 3) to facilitate insertion therebetween of the stem 17 of a flower 18. When the stem 17 is thus inserted and the flower disposed at the desired angle with respect to the holder, pin 15 is withdrawn from the opening 13 in the clip whereupon the leaves of the latter spring toward their normal abutting relationship (Figure 4) and clamp the flower stem. When the flower stems are too large to permit insertion between the jaws of the clip 10 with the pin 15 inserted in the opening 13 thereof, the jaws may be sprung farther apart by partial turning of pin 15 the shank 14 of which then acts as a cam to force the jaws of the clip apart. When the larger stems have been inserted between the jaws of the clip 10, pin 15 may then be rotated for realinement with the opening 13 and convenient withdrawal.

The anti-tipping means shown in the drawing consists of a thin, flat annular disk or plate 20 of considerably greater diameter than the base 11 and carrying means whereby the latter may be secured coaxially of the plate. In the preferred form a central opening 22 is provided in plate 20, as a seat for the base 11 of the flower holder, and four prongs 21, arranged about the peripheral edge of opening 22 and integral with plate 20, are bent inwardly to bear against the top of the flower holder and lock it against tipping relative to the plate.

It will be apparent that the added weight of the disk 20 thus engaging the base 11 of the flower holder will be sufficient in the instance of lighter flowers and arrangements to prevent accidental tipping even though the arrangement be off-center. In the cases of heavier flowers arranged in off-center relation to the holder, disk 20 provides an adequate base surface upon which there may be arranged ornamental weights of any kind, such as rocks 23 (as in Figure 1).

The preferred form of construction permits ready assembly of the flower holder and the plate 20, as the latter is merely dropped over the former to make a connection entirely suitable for the purposes to which the device is adapted.

It will be understood, of course, that while I have provided a central opening 22 and inwardly turned prongs 21 as a means of connecting the flat disk 20 to the base member 11 other forms of connection may be employed without departing from the spirit of this invention.

It is believed clear from the foregoing that the present invention represents a substantial advance in the art of flower holders and provides a device of considerable utility and versatility for the purpose intended. Furthermore, the device may be constructed of extremely light and inexpensive materials such as the well known plastics and will lend itself to quite satisfactory blending into the composite mass of many floral arrangements.

Protection on the flower holder forming the subject matter hereof is desired within the scope of the appended claim.

The invention claimed is:

A flower holder comprising a base member, a plurality of upright spring clips formed of pairs of normally abutting leaves fixed on said member and arranged in parallel rows thereon, each pair of leaves being deformed complementarily adjacent the base member to form an elliptical opening; the openings of each row of clips being in horizontal alignment, and a withdrawable pin having a shank of oval cross-section seated in the openings of a row of the clips and adapted to be turned therein to spread the leaves by cam action for reception of plant stems.

ARTHUR D. GIFFORD.